United States Patent [19]
Murphy et al.

[11] Patent Number: 5,286,931
[45] Date of Patent: Feb. 15, 1994

[54] GAUGE WITH INDICATOR SWITCH

[75] Inventors: Edward P. Murphy, Blaine, Minn.; Dennis Balogh, Garland, Tex.

[73] Assignee: Graco Inc., Golden Valley, Minn.

[21] Appl. No.: 35,979

[22] Filed: Mar. 23, 1993

[51] Int. Cl.5 .............................. H01H 35/36
[52] U.S. Cl. ..................... 200/81.8; 73/733; 200/56 R
[58] Field of Search ................. 340/611, 626; 73/732, 73/733, 737, 738, 743; 200/81 R, 81.8, 308, 56 R; 307/118

[56] References Cited

U.S. PATENT DOCUMENTS

| | | | |
|---|---|---|---|
| 3,533,294 | 10/1970 | Fahy | 73/411 |
| 4,323,741 | 4/1982 | Krohn | 200/81.9 R |
| 4,397,610 | 8/1983 | Krohn | 417/44 |
| 4,485,727 | 12/1984 | Schollenberger | 92/13.2 |
| 4,641,533 | 2/1987 | Mueller | 73/706 |

Primary Examiner—Gerald P. Tolin
Attorney, Agent, or Firm—Palmatier, Sjoquist & Helget

[57] ABSTRACT

A pressure gauge and indicator switch wherein a Bourdon tube and electrical switch are sealably contained within a liquid-filled compartment, and a liquid pathway is provided between the Bourdon tube and an external fitting. The electrical switch leads are connectable outside the compartment, and the Bourdon tube is mechanically linked to a pressure indicator so as to provide an analog reading of actual pressure within the Bourdon tube, and the Bourdon tube is mechanically linked to the pressure switch so as to provide a switch actuation whenever the pressure within the Bourdon tube reaches a predetermined level.

8 Claims, 1 Drawing Sheet

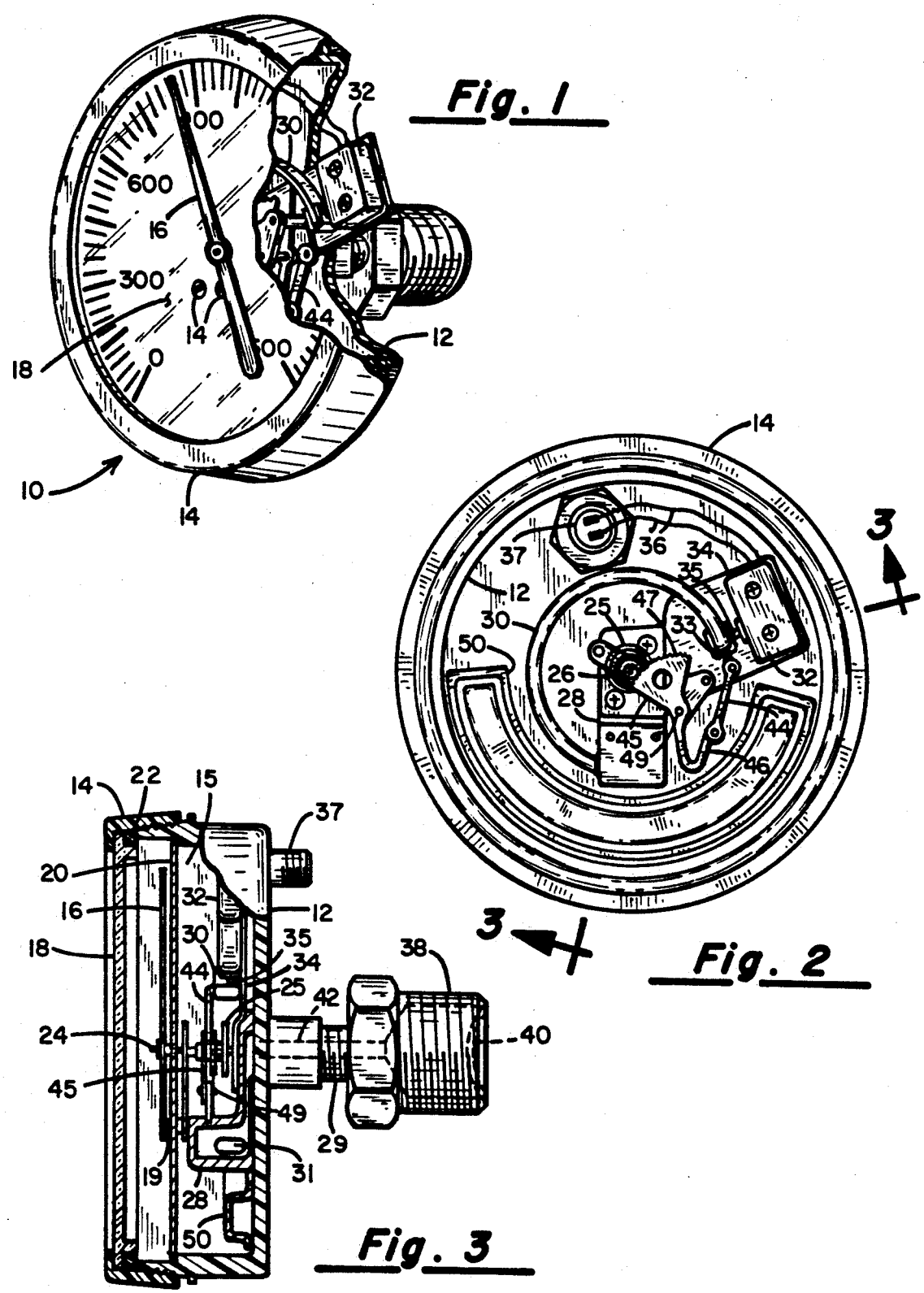

GAUGE WITH INDICATOR SWITCH

BACKGROUND OF THE INVENTION

The present invention relates to measurement and control systems for the delivery of liquids under relatively high hydraulic pressures. In particular, the invention relates to a liquid pressure gauge having an indicator for providing a direct readout of pressure, and having an internal electrical switch which may be activated at certain predetermined pressures.

Pressure gauges for monitoring the pressures within a hydraulic delivery line are well known. Such pressure gauges are typically interposed into the liquid delivery conduit so as to be in direct contact with the pressurized liquid therein. A pressure-responsive element typically includes a transducer which translates liquid pressure into a physical movement, and the physical movement is mechanically linked to an indicator device. The pressure gauges which are known in the prior art include pressure gauges wherein a Bourdon tube has an opening which is in contact with the pressurized liquid, and also includes liquid-filled Bourdon tubes wherein the liquid is sealed into the tube by means of a movable diaphragm sealing disk mounted at the end of the Bourdon tube, wherein the end of the Bourdon tube is then placed in a liquid delivery conduit so as to be exposed to liquid pressures therein via the diaphragm.

Pressure control switches are also known, wherein an electrical switch activation lever is placed in proximity to a Bourdon tube pressure sensor, wherein pressure changes cause the Bourdon tube to deflect and move the switch actuator, thereby generating an electrical signal at the pressure level at which contact is made. U.S. Pat. No. 4,323,741, issued Apr. 6, 1982, and U.S. Pat. No. 4,397,610, issued Aug. 9, 1983, disclose two forms of pressure-control device wherein these principles are used.

SUMMARY OF THE INVENTION

The present invention incorporates a liquid-filled Bourdon tube in a gauge housing wherein one end of the Bourdon tube communicates with a fitting projecting external the housing, with a movable diaphragm sealingly fitted over the end. A second closed end of the Bourdon tube is mechanically linked to a rotatable shaft which is connected to an indicator needle. The indicator needle moves over a surface inscribed with incremental pressure indications, and physical movement of the Bourdon tube end is translated to rotational movement of the shaft and thereby to movement of the indicator needle. An electrical switch is also affixed in the housing in proximity to the movable end of the Bourdon tube, whereby a predetermined movement of the Bourdon tube causes actuation of the switch, and the electrical switch contacts are brought to the outside of the housing through a suitable fitting. The front of the housing is sealingly enclosed with a transparent window, and the entire housing is filled with a liquid such as glycerin.

It is the principal object and advantage of the invention to provide a pressure gauge for connection to a hydraulic delivery line for providing direct indications of pressure, and for providing an electrical signal at predetermined pressure levels.

It is another advantage and object of the present invention to provide a pressure gauge and indicator switch combination wherein vibration of the movable parts is dampened by the liquid filling the housing.

It is a further object and advantage of the present invention to provide a pressure gauge and switch indicator which is unaffected by wide temperature variations and mechanical vibrations.

The foregoing and other objects and advantages of the invention will become apparent from the following specification, and with reference to the appended drawings.

BRIEF DESCRIPTION OF THE DRAWINGS

FIG. 1 shows an isometric view of the invention in partial breakaway;

FIG. 2 shows the mechanical moving components of the invention; and

FIG. 3 shows a cross-sectional view of the invention taken along the lines 3—3 of FIG. 2.

DESCRIPTION OF THE PREFERRED EMBODIMENT

Referring to the drawings, a pressure gauge and indicator 10 is shown in several views, wherein like features of the invention are represented by like numbers. Pressure gauge 10 has an outer housing 12 for supporting the components to be described herein. A cover 14 is threadably attachable to outer housing 12, and cover 14 confines a transparent face plate 18 against an O-ring 22 which is fitted about the forward edge of outer housing 12. Cover 14 is intended to be threadably secured against outer housing 12 so as to provide a liquid-tight seal between face plate 18 and housing 12. This creates an inner compartment 15 in pressure gauge 10, which compartment may be filled with liquid in a manner to be hereinafter described.

A sub-housing 28 is affixed to housing 12, wherein sub-housing 28 is mounted in fixed position within compartment 15. Sub-housing 28 provides the mounting support for the various fixed and movable components which comprise the invention. An indicator plate 20 is affixed to sub-housing 28 by screws 19; indicator plate 20 preferably has calibrated markings on its outer face, which markings are indicative of pressure readings. An indicator shaft 24 is rotatably mounted to sub-housing 28, wherein shaft 24 has a gear 26 affixed thereto, and the forward end of shaft 24 projects through a central opening in indicator plate 20. An indicator needle 16 is affixed to the forward end of shaft 24, and needle 16 rotates over an angular path in coincidence with the rotation of shaft 24.

Sub-housing 28 projects rearwardly through housing 12 via a stem 29 which has a threadable end. An adapter nut 38 may be threadably secured to stem 29, and adapter 38 has an expanded passageway therein, terminating in a diaphragm 40 which is sealably affixed to the outer end of adapter nut 38. The expanded passageway within adapter nut 38 communicates with passage 42, and passage 42 communicates with an inner chamber in sub-housing 28. A Bourdon tube 30 is affixed to sub-housing 28, and the opening 31 of Bourdon tube 30 opens into the chamber within sub-housing 28. The distal end 33 of Bourdon tube 30 is sealably closed. In operation, a liquid such as glycerin is introduced into the chamber and passages associated with sub-housing 28, so as to completely fill the Bourdon tube 30, the chamber, the passage 42 and the expanded passage within adapter nut 38 with liquid. The liquid is prevented from escaping by diaphragm 40 at one end, and by the sealed and closed end 33 of Bourdon tube 30.

A switch 32 is affixed to a bracket 34, and bracket 34 is affixed to sub-housing 28. Switch 32 is preferably a microswitch having an actuator pin 35 projecting therefrom. Actuator pin 35 is closely positioned adjacent the sealed distal end 33 of Bourdon tube 30. A link 44 is pivotally affixed to the distal end 33 at one of its ends, and the other of its ends is pivotally affixed to an extension 46 of gear plate 45. Gear plate 45 has a toothed arcuate edge 47 which engages gear 26, and gear plate 45 is pivotally connected to sub-housing 28 at a pivot pin 49. An indicator spring 25 is affixed at one of its ends to indicator shaft 24, and at the other of its ends to sub-housing 28. Indicator spring 25 is pre-biased to urge counterclockwise rotation of shaft 24, so as to urge indicator needle 16 in a counterclockwise direction. A mechanical stop limits the rotation of shaft 24 by abutting contact against an edge of gear plate 45. Upon proper calibration, the normal rest position for indicator needle 16 is at the zero pressure indication on face plate 20.

A sealed, air-filled rubber bladder 50 is affixed within compartment 15, and serves as a pressure equalization mechanism. After compartment 15 has been filled with a liquid such as glycerin, the rubber bladder 50 deforms until pressure equalization is achieved between the air pressure inside of the bladder and the liquid pressure outside in compartment 15. Changes in atmospheric pressure may increase the pressure of the liquid within compartment 15, and this increase in pressure causes a further deformity of bladder 50 so as to continuously maintain pressure equalization. Likewise, decreases in atmospheric pressure will result in expansion of the air bladder 50 to likewise equalize pressure. In this manner, pressure forces within compartment 15 will be stabilized so as to minimize the possibility of liquid leakage from pressure gauge 10, and to compensate for relative expansion and contraction of the liquid within compartment 15. At the same time, air bladder 50 provides the mechanism to enable the compartment 15 to be completely filled with liquid under all conditions.

Microswitch 32 has its electrical leads 36 connected to a plug 37. The electrical connections thereto are sealably passed to the exterior of housing 12, to a connector which is adapted for connection to a suitable receptacle. Therefore, the actuation of the switch contacts of switch 32 may be electrically coupled to the exterior of pressure gauge 10.

In operation, the principles of Bourdon tube operation cause the distal end of Bourdon tube 30 to move over a measurable path upon changes of pressure of the liquid within Bourdon tube 30. In effect, as the liquid pressure in Bourdon tube 30 increases the Bourdon tube tends to deflect, thereby causing the distal end 33 to move outwardly to engage switch actuator pin 35. Switch 32 may be positioned relative to the distal end 33 so as to establish a predetermined position where the switch becomes actuated, and this predetermined position is related to the pressure within Bourdon tube 30. Therefore, at a predetermined pressure level within Bourdon tube 30, switch 32 becomes actuated, and the actuation signal is transferred external the pressure gauge via conductors 36 and plug 37.

At the same time, the physical movement of the distal end 33 of Bourdon tube 30 is mechanically linked to extension arm 46 of gear plate 45. This causes gear plate 45 to rotate about its pivot pin mounting 49, and the toothed edge 47 engages gear 26 to cause rotation of shaft 24. This rotation is in opposition to the force of spring 25, and causes needle indicator 16 to move about an arcuate path over indicator plate 20, thereby providing a reading of the corresponding pressure within Bourdon tube 30. Naturally, the linkages and other mechanical connections are established so as to provide a calibrated pressure reading for Bourdon tube pressures.

The liquid within Bourdon tube 30 is communicated via the opening 31 into the chamber of sub-housing 28. The liquid in this chamber is in direct communication with diaphragm 40, which is preferably connected into a liquid flow conduit containing the liquid whose pressure is sought to be measured. Therefore, as the pressure in the liquid flow conduit to which adapter nut 38 is connected increases, the diaphragm 40 deflects inwardly and correspondingly increases the pressure in Bourdon tube 30. As the liquid conduit pressure decreases the pressure against diaphragm 40 is relaxed and the corresponding pressure in Bourdon tube 30 is decreased. Therefore, a direct relationship is established between the pressure in the conduit to which the adapter nut 38 is threadably attached and the reading provided by indicator needle 16. Also, at some predetermined pressure level within the conduit in question, the distal end 33 of Bourdon tube 30 causes actuation of switch 32, thereby providing an external electrical signal which is indicative of this predetermined pressure.

In a preferred embodiment, the adapter nut 38 is secured into a liquid flow conduit which is coupled to a pumping system driven by an electric motor. Therefore, upon reaching a predetermined liquid pressure, the electrical signals from switch 32 can be utilized to disconnect the power from the electric motor driving the pumping system, thereby preventing further pressure buildup. If the system pressure drops below the pressure setting by a predetermined amount, switch 32 becomes deactuated and the electrical signal resulting therefrom may be used to restart the electric motor which drives the pumping system.

The complete filling of compartment 15 with a liquid such as glycerin provides a unique enhancement to the invention; namely, that the glycerin provides a certain stability and damping to the mechanical moving parts within the compartment 15, and glycerin provides for a wide range of temperature operation. Glycerin remains in liquid form over at least the temperature range $-20°$ F. to $150°$ F., which enables the invention to be utilized over this temperature range without fear from freezing. This greatly increases the operating environment for using the invention, and provides a very reliable pressure switch mechanism in combination with the indicator under conditions where prior art devices would be susceptible to freezing.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A pressure gauge and indicator apparatus, comprising:
    a) a housing and a cover threadably attached to said housing to form a sealable compartment therebetween, said cover having a transparent window;

b) a Bourdon tube mounted to said housing in said compartment, said tube having a sealed end in said compartment and having an open end coupled to a liquid passage;

c) a fitting sealably mounted to said housing outside said compartment, said fitting having means for holding a diaphragm closure proximate an end and having passages coupled to said liquid passage;

d) a rotatable shaft mounted to said housing in said compartment, said shaft having a forward end connected to an indicator needle and having a gear affixed along the length of said shaft;

e) a pivotable gear plate mounted to said housing in said compartment, said plate having an edge with teeth engageable with said gear and having a mechanical linkage to said sealed end of the Bourdon tube;

f) an electrical switch mounted to said housing in said compartment, said switch having an actuator proximate said sealed end of said Bourdon tube, and electrical conductors connected to said switch; and g) a connector plug on said housing, said connector plug having means in said compartment for connecting to said electrical conductors and means outside said compartment for providing electrical contact with said conductors outside said compartment.

2. The apparatus of claim 1, further comprising a first liquid filling said compartment, and further comprising an air-filled resilient bladder in said compartment.

3. The apparatus of claim 2, further comprising a second liquid filling said Bourdon tube and said passages coupled to said tube.

4. The apparatus of claim 3, further comprising spring means in said compartment, having a first end connected to said housing and a second end connected to said rotatable shaft.

5. The apparatus of claim 4, further comprising an indicator plate in said housing positioned rearwardly adjacent said indicator needle, said indicator plate having a surface with pressure markings thereon facing said transparent window.

6. The apparatus of claim 4, further comprising stop means for limiting the movement of said indicator needle.

7. The apparatus of claim 2, wherein said first liquid is glycerine.

8. The apparatus of claim 3, wherein said second liquid is glycerine.

* * * * *